Dec. 22, 1953     W. F. MacGLASHAN, JR     2,663,458
RUPTURE DIAPHRAGM UNIT
Filed May 11, 1950

Inventor
William F. MacGlashan, Jr.

By G. J. Kesserich & J. H. Church
Attorneys

Patented Dec. 22, 1953

2,663,458

UNITED STATES PATENT OFFICE 2,663,458

RUPTURE DIAPHRAGM UNIT

William F. MacGlashan, Jr., Alhambra, Calif., assignor to the United States of America as represented by the Secretary of the Army Application May 11, 1950, Serial No. 161,395

3 Claims. (Cl. 220—89)

The invention relates to rupture diaphragm units and more specifically to a unit which will prevent particles of the ruptured diaphragm from entering the line.

An object of this invention is to provide a diaphragm and housing arranged that when the diaphragm is ruptured the parts are caught or trapped in the housing and prevented from entering pneumatic or hydraulic lines connected with the housing.

The specific nature of the invention as well as other objects and advantages thereof will clearly appear from the following description and drawings in which.

Figure 1:
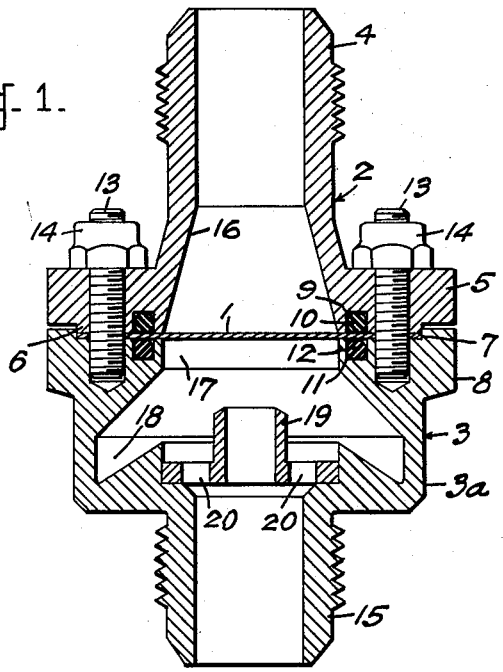
Figure 1 is a longitudinal sectional view of the assembled housing and diaphragm.
Figure 2:
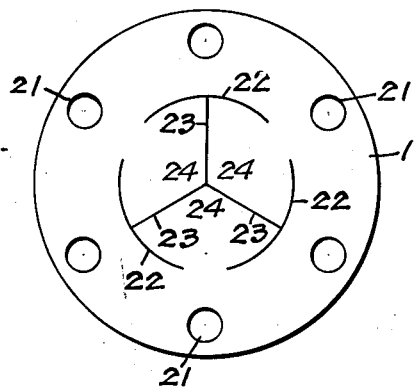
Figure 2 is a plan view of the diaphragm.

Referring now to the drawings by characters of reference there is shown in Figure 1 an embodiment of the invention wherein 1 indicates a thin frangible diaphragm clamped between the housing members 2 and 3. The housing member 2 includes a nipple 4 at one end for fastening the housing to a pneumatic or hydraulic line. The opposite end of member 2 has formed thereon a flange 5 having a circular projection 6 on its face to mate with a recess 7, in which the diaphragm is seated, in the flange 8 of housing member 3. The circular projection 6 has formed therein a channel 9 in which is positioned a gasket 10 and the recess similarly provided with a channel 11 and gasket 12 for sealing relation with the diaphragm. The flanges 5 and 8 are coupled by any convenient manner as by bolts 13 and nuts 14. The bore 16 of housing member 3 is provided with an opening 17 in its flanged end aligned with the bore 16 in communication with said diaphragm, and a nipple 15 at its opposite end. Adjacent to the opening 17 and formed in the body 3a of member 3 is a downwardly and outwardly directed annular chamber 18. The central portion of the chamber 18 is provided with a tubular boss 19 having radially disposed perforations 20 therein forming passages between the chamber 18 and the bore of nipple 15 to permit the flow of fluid after the diaphragm has been ruptured. The diaphragm has spaced perforations 21 in the marginal area to accommodate the bolts 13. The center portion of the diaphragm is provided with arcuate scores 22 and radial scores 23 extending from the center of the diaphragm to the center of each arcuate score to form downwardly directed petals 24 projecting into the chamber when said diaphragm is ruptured.

I claim—

1. A safety device comprising an upper housing having a central bore, a lower housing having a central stepped bore provided with a first cylindrical portion in axial alinement with the bore in said upper housing, and a second portion comprising a downwardly and outwardly tapering upper wall, an axially extending side wall, and a lower wall extending upwardly and inwardly in substantial parallel alinement with said upper wall, said second portion forming an enlarged trap chamber, each of said housings having flanged contiguous surfaces, a rupturable diaphragm disposed between said contiguous surfaces and separating said upper bore and said stepped bore, and means to secure together said upper housing, said lower housing and said diaphragm, said rupturable diaphragm having a first plurality of circumferentially alined arcuate scores, and a second plurality of radial scores extending from the mid-point of each arcuate score to the center of said diaphragm whereby said scores form petals to be caught in said trap chamber when said diaphragm is ruptured.

2. A rupture diaphragm unit comprising an upper housing having a downwardly and outwardly tapering bore, and a lower housing having a stepped central bore comprising a first cylindrical portion in axial alinement with the larger end of said tapering bore and merging with a second downwardly and outwardly tapering second portion, said second portion in turn merging with a third portion having an axially extending side wall and a lower wall extending upwardly and inwardly in substantial parallel alinement with the surface of said tapering second portion, the radially inner ends of said lower wall defining a bore having a diameter substantially equal to the diameter of said first cylindrical portion, said axially extending side wall and said lower wall forming a trap chamber, a downwardly extending nipple integral with said lower wall and having a bore of diameter smaller than the diameter of the bore formed by said lower wall and forming therebetween a shoulder, a cylindrical insert disposed in said bore formed by said lower wall and abutting said shoulder, an upwardly extending central boss integral with said insert and having an axial bore, there being a plurality of circumferential holes in said insert and about said boss, said holes and said axial bore providing fluid communication between said stepped central bore and the bore in said nipple, and a rupturable diaphragm clamped between said lower and upper housing.

3. The combination in claim 2 wherein said rupturable diaphragm is provided with a first plurality of arcuate circumferentially alined scores, and a second plurality of radial scores extending from the mid-point of each arcuate score to the center of said diaphragm whereby said scores form petals to be caught in said trap chamber when said diaphragm is ruptured.

WILLIAM F. MACGLASHAN, JR.

References Cited in the file of this patent

UNITED STATES PATENTS

| Number | Name | Date |
|---|---|---|
| 1,697,199 | McKenzie-Martyn | Jan. 1, 1929 |
| 1,974,254 | Allen et al. | Sept. 18, 1934 |
| 2,095,828 | Nerad | Oct. 12, 1937 |
| 2,183,208 | Allen et al. | Dec. 12, 1939 |
| 2,263,840 | Franck | Nov. 25, 1941 |
| 2,370,870 | McKeague | Mar. 6, 1945 |
| 2,437,836 | Santiago | Mar. 16, 1948 |
| 2,474,826 | Cantlin | July 5, 1949 |
| 2,548,744 | Simms | Apr. 10, 1951 |
| 2,557,120 | Knoblock | June 19, 1951 |
| 2,582,171 | Simpson | Jan. 8, 1952 |
| 2,630,939 | Jones | Mar. 10, 1953 |